(12) United States Patent
Sato et al.

(10) Patent No.: US 8,906,571 B2
(45) Date of Patent: Dec. 9, 2014

(54) FUEL CELL SEPARATOR, MANUFACTURING METHOD OF THE FUEL CELL SEPARATOR, AND FUEL CELL

(75) Inventors: Takayasu Sato, Toyota (JP); Hidenori Obayashi, Toyoto (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 868 days.

(21) Appl. No.: 12/527,989

(22) PCT Filed: Feb. 12, 2008

(86) PCT No.: PCT/JP2008/052784
§ 371 (c)(1),
(2), (4) Date: Aug. 20, 2009

(87) PCT Pub. No.: WO2008/114561
PCT Pub. Date: Sep. 25, 2008

(65) Prior Publication Data
US 2010/0035120 A1    Feb. 11, 2010

(30) Foreign Application Priority Data
Feb. 22, 2007 (JP) .................................. 2007-041592

(51) Int. Cl.
 *H01M 2/14* (2006.01)
 *H01M 8/02* (2006.01)
(52) U.S. Cl.
 CPC .......... *H01M 8/0206* (2013.01); *H01M 8/0226* (2013.01); *Y02E 60/50* (2013.01); *H01M 8/0228* (2013.01); *H01M 8/0213* (2013.01)
 USPC .......................................... 429/457; 429/514

(58) Field of Classification Search
 USPC .................. 429/455–457, 512–514; 427/115
 See application file for complete search history.

(56) References Cited

U.S. PATENT DOCUMENTS

| 5,389,270 | A  | * | 2/1995  | Thorn et al. ................... 508/122 |
| 6,261,421 | B1 |   | 7/2001  | Meunier et al. |
| 6,291,094 | B1 | * | 9/2001  | Yoshimura et al. ........... 429/492 |
| 2003/0228510 | A1 |   | 12/2003 | Nakata et al. |
| 2004/0048134 | A1 | * | 3/2004  | Kihira et al. ..................... 429/34 |
| 2005/0098437 | A1 |   | 5/2005  | Shiepe |
| 2006/0154131 | A1 |   | 7/2006  | Seido et al. |

FOREIGN PATENT DOCUMENTS

| CN | 1797814 A     | 7/2006  |
| EP | 1 227 531 A1  | 7/2002  |
| JP | 2000-164228 A | 6/2000  |
| JP | 2001-283872 A | 10/2001 |
| JP | 2001-357859 A | 12/2001 |

(Continued)

OTHER PUBLICATIONS

Office Action issued May 31, 2011 in Canadian Patent Application No. 2,676,704.

(Continued)

*Primary Examiner* — Carlos Barcena
(74) *Attorney, Agent, or Firm* — Kenyon & Kenyon LLP

(57) ABSTRACT

Provided is a fuel cell separator having a coating layer on a metal substrate. The coating layer is provided with an amorphous carbon layer and a conductive section. The conductive section is composed of graphite particles, which are preferably dispersed in the manner of islands each of which has at least a part exposed from the surface of the amorphous carbon layer.

10 Claims, 13 Drawing Sheets

(56) References Cited

FOREIGN PATENT DOCUMENTS

| | | |
|---|---|---|
| JP | 2002-151110 A | 5/2002 |
| JP | 2002-216786 A | 8/2002 |
| JP | 2002-294430 A | 10/2002 |
| JP | 2003-511832 A | 3/2003 |
| JP | 2003-123781 A | 4/2003 |
| JP | 2004-181565 A | 7/2004 |
| JP | 2005-93172 A | 4/2005 |
| JP | 2007-157639 A | 6/2007 |
| JP | 2007157639 A | 6/2007 |
| JP | 2008-41390 A | 2/2008 |
| WO | WO 01/06585 A1 | 1/2001 |
| WO | 2006-082734 A1 | 8/2006 |
| WO | 2006082734 | 8/2006 |
| WO | 2007/091139 A1 | 8/2007 |

OTHER PUBLICATIONS

Office Action issued May 25, 2011 in Chinese Patent Application No. 200880005638.7 & partial translation thereof.
Supplementary European Search Report issued Nov. 24, 2011.
Office Action issued Dec. 12, 2011 in Canadian Application No. 2,676,704.
Japanese Office Action dated Jan. 15, 2013.

* cited by examiner

EXAMPLE 2: APPLICATION OF BIAS VOLTAGE OF 150 V

EXAMPLE 8: APPLICATION OF BIAS VOLTAGE OF 0 V

FUEL CELL SEPARATOR, MANUFACTURING METHOD OF THE FUEL CELL SEPARATOR, AND FUEL CELL

This is a 371 national phase application of PCT/JP2008/052784 filed 12 Feb. 2008, claiming priority to Japanese Patent Application No. JP 2007-041592 filed 22 Feb. 2007, the contents of which are incorporated herein by reference.

TECHNICAL FIELD

The present invention relates to technologies of a fuel cell separator, a manufacturing method of the fuel cell separator, and a fuel cell.

BACKGROUND ART

In general, a fuel cell has an electrolyte film, a pair of electrodes (an anode and a cathode) each including a catalyst layer and a diffusion layer, and a pair of fuel cell separators (an anode side separator and a cathode side separator) that sandwich the electrodes therebetween. In power generation by the fuel cell, when an anode gas supplied to the anode is a hydrogen gas and a cathode gas supplied to the cathode is an oxygen gas, a reaction of producing hydrogen ions and electrons proceeds on the anode side, and the hydrogen ions reach the cathode side through the electrolyte film, whereas the electrons reach the cathode through an external circuit. Meanwhile, on the cathode side, the hydrogen ions, the electrons, and the oxygen gas react to generate water, thereby emitting energy.

Examples of the fuel cell separator include a separator having a substrate formed of carbon, and a separator having a substrate formed of a metal.

The fuel cell separator having the substrate formed of the metal is superior in mechanical strength and moldability as compared with the fuel cell separator having the substrate formed of carbon. However, as described above, the fuel cell generates moisture during power generation, and hence the fuel cell separator having the substrate formed of the metal is apt to corrode as compared with the fuel cell separator having the substrate formed of carbon. When the fuel cell separator having the substrate formed of the metal corrodes, contact resistance increases, which may result in deterioration in the performance of the fuel cell. It is to be noted that, a simple description "the contact resistance of the fuel cell separator" used herein means both a similar material contact resistance (a contact resistance between similar fuel cell separators) and a diffusion layer contact resistance (a contact resistance between the fuel cell separator and the diffusion layer).

For example, to suppress the corrosion of the metal substrate, there is known a fuel cell separator having a metal substrate subjected to plating of a noble metal such as Au or Pt. However, the noble metals are expensive, and the plating requires use of a large amount of the noble metal, which is not practical. Alternatively, the corrosion of the metal substrate can be suppressed by forming a graphite layer on the metal substrate, but the formation of the graphite metal thereon is technically difficult.

Furthermore, for example, a booklet of International Publication No. 01-006585 discloses a fuel cell separator having a metal substrate coated with diamond-like carbon to suppress the corrosion of the metal substrate.

Furthermore, for example, JP 2003-123781 A discloses a fuel cell separator having a metal substrate coated with diamond-like carbon containing a metal to suppress the corrosion of the metal substrate.

Furthermore, for example, JP 2002-151110 A discloses a fuel cell separator in which an oxide layer is formed on a metal substrate and a conductive layer is further formed on a surface of the oxide layer to suppress the corrosion of the metal substrate and an increase in the contact resistance of the fuel cell separator.

Furthermore, for example, JP 2000-164228 A discloses a fuel cell separator in which a low-electric resistance layer and an anti-corrosion layer are formed on a metal substrate surface to suppress the corrosion of the metal substrate and the increase in the contact resistance of the fuel cell separator.

Furthermore, for example, JP 2001-283872 A discloses a fuel cell separator in which carbon particles dispersed in the manners of islands on a metal substrate are coupled with an upper side of the metal substrate through a chrome carbide layer to suppress the increase in the contact resistance of the fuel cell separator.

However, in the fuel cell separator disclosed in the booklet of International Publication No. 01-006585, the diamond-like carbon corrodes depending on a power generation environment; e.g., an operating temperature of the fuel cell (e.g., 70° C. or above), moisture generated at the time of power generation, or a potential difference involved in a power generation reaction, with the result that the contact resistance of the fuel cell separator inconveniently increases.

Moreover, in the fuel cell separator disclosed in JP 2003-123781 A, the metal corrodes together with the diamond-like carbon depending on a power generation environment of the fuel cell, and consequently the metal is turned to a metal oxide, with the result that the contact resistance of the fuel cell separator increases further.

Additionally, in the fuel cell separators disclosed in JP 2002-151110 A and JP 2000-164228 A, metal materials are used for all of the conductive layer, the low-electric resistance layer, and the anti-corrosion layer, and hence the conductive layer, the low-electric resistance layer, and the anti-corrosion layer corrode depending on a power generation environment of each fuel cell, thereby increasing the contact resistance of each fuel cell separator.

Furthermore, in the fuel cell separator disclosed in JP 2001-283872 A, not the entire metal substrate is covered with the chrome carbide layer and the carbon particles, and hence the metal substrate corrodes depending on a power generation environment of the fuel cell, thereby increasing the contact resistance of the fuel cell separator.

DISCLOSURE OF THE INVENTION

An object of the present invention is to provide a fuel cell separator which can suppress the corrosion of a metal substrate and inhibit an increase in contact resistance of the fuel cell separator even in a fuel cell power generation environment; e.g., an operating temperature of the fuel cell (e.g., 70° C. or above), moisture generated at the time of power generation, or a potential difference involved in a power generation reaction; a manufacturing method of the fuel cell separator; and a fuel cell including the fuel cell separator.

(1) A first aspect of the present invention is directed to a fuel cell separator which has a coating layer on a metal substrate, wherein the coating layer has an amorphous carbon layer and conductive sections.

(2) The fuel cell separator according to the above (1), wherein the conductive sections are preferably graphite sections formed of graphite particles.

(3) The fuel cell separator according to the above (2), wherein the graphite sections are preferably arranged in a state where the graphite sections are at least partially exposed from a surface of the amorphous carbon layer.

(4) The fuel cell separator according to the above (3), wherein the graphite sections are preferably dispersed and arranged in the manner of islands.

(5) The fuel cell separator according to the above (4), wherein graphite sections having particle diameters of less than 1 μm among the graphite sections are preferably present in a ratio of 12.6 or more per μm$^2$ of the amorphous carbon layer.

(6) The fuel cell separator according to the above (4), wherein graphite sections having particle diameters of 1 μm or above to less than 3 μm among the graphite sections are preferably present in a ratio of 1.8 or more per μm$^2$ of the amorphous carbon layer.

(7) The fuel cell separator according to the above (4), wherein graphite sections having particle diameters of 3 μm or above among the graphite sections are preferably present in a ratio of 0.1 or more per μm$^2$ of the amorphous carbon layer.

(8) The fuel cell separator according to any one of the above (2) to (7), wherein the film thickness of the amorphous carbon layer is preferably within a range of 30 nm to 10 μm.

(9) The fuel cell separator according to any one of the above (2) to (8), wherein the corrosion current value of the coating layer is preferably 1.5 μA/cm$^2$ or less.

(10) The fuel cell separator according to any one of the above (2) to (9), wherein the material of the metal substrate is preferably titanium, and a titanium layer containing, as a material, titanium having a higher titanium purity than titanium of the metal substrate is preferably arranged between the metal substrate and the coating layer.

(11) The fuel cell separator according to the above (10), wherein the film thickness of the titanium layer is preferably within a range of 25 nm to 10 μm.

(12) A second aspect of the present invention is directed to a fuel cell including a fuel cell separator which has a coating layer on a metal substrate, wherein the coating layer has an amorphous carbon layer and conductive sections.

(13) A third aspect of the present invention is directed to a manufacturing method of a fuel cell separator which comprises an amorphous carbon layer forming step of forming an amorphous carbon layer on a metal substrate by means of a physical vapor deposition method or a chemical vapor deposition method; and a conductive sections forming step of forming conductive sections on the amorphous carbon layer by means of a method which is equivalent to or different from the physical vapor deposition method or the chemical vapor deposition method.

(14) The manufacturing method of the fuel cell separator according to the above (13), wherein the physical vapor deposition method of the amorphous carbon layer forming step and the conductive sections forming step is preferably a filterless arc ion plating method, and the filterless arc ion plating method is preferably used to form the amorphous carbon layer and form graphite sections as the conductive sections.

(15) The manufacturing method of the fuel cell separator according to the above (14), wherein a bias voltage applied to the metal substrate when forming the amorphous carbon layer and the graphite sections preferably falls within a range of 150 V to 1000 V.

(16) The manufacturing method of the fuel cell separator according to the above (15), wherein a bias voltage applied to the metal substrate when forming the amorphous carbon layer and the graphite sections preferably falls within a range of 150 V to 250 V.

(17) A fourth aspect of the present invention is directed to a fuel cell separator which is obtained by the manufacturing method of the fuel cell separator according to any one of the above (13) to (16).

According to the present invention, the coating layer on the metal substrate is constituted of the amorphous carbon layer and conductive sections, whereby there can be provided the fuel cell separator which can suppress the corrosion of the metal substrate and inhibit an increase in contact resistance of the fuel cell separator even in the fuel cell power generation environment, and the fuel cell including the fuel cell separator.

Furthermore, according to the present invention, there is provided the manufacturing method of the fuel cell separator which includes an amorphous carbon layer forming step of forming the amorphous carbon layer on the metal substrate by means of a physical vapor deposition method or a chemical vapor deposition method, and a conductive sections forming step of forming the conductive sections on the amorphous carbon layer by means of a method equivalent to or different from the physical vapor deposition method or the chemical vapor deposition method, whereby the corrosion of the metal substrate can be suppressed and an increase in the contact resistance of the fuel cell separator can be inhibited even in the fuel cell power generation environment.

BEST MODE FOR CARRYING OUT THE INVENTION

Embodiments according to the present invention will now be described hereinafter.

Figure 1:
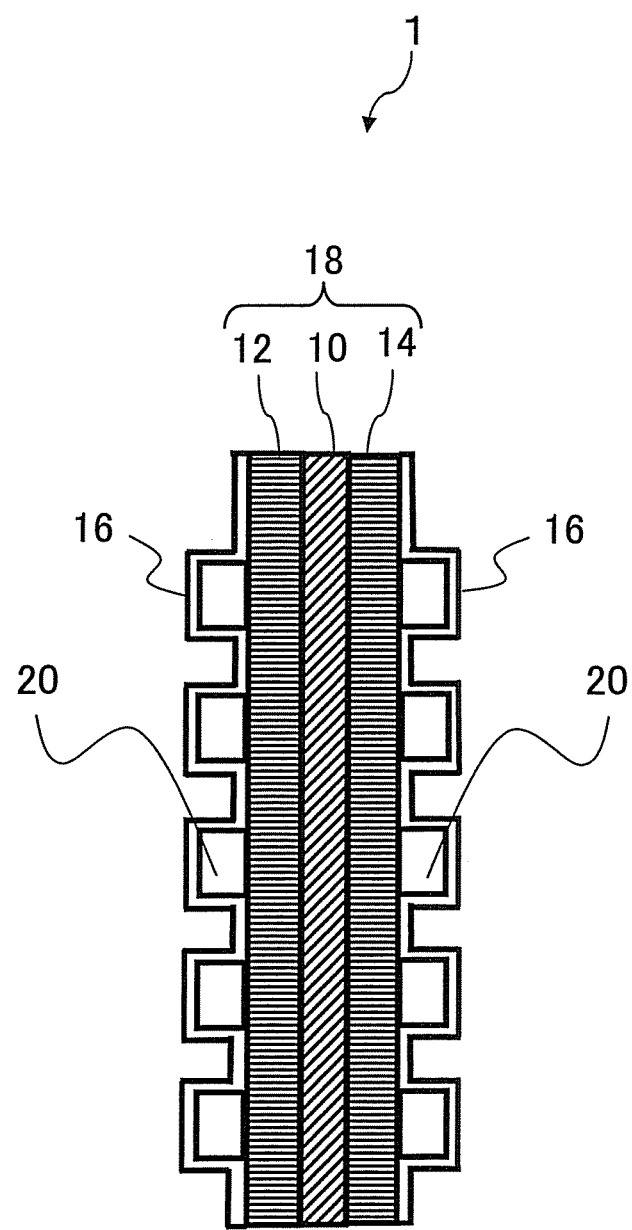
FIG. 1 is a schematic cross-sectional view showing an example configuration of a fuel cell according to an embodiment of the present invention.

FIG. 1 is a schematic cross-sectional view showing an example configuration of a fuel cell according to an embodiment of the present invention. As shown in FIG. 1, a fuel cell 1 includes an electrolyte film 10, an anode 12, a cathode 14, and fuel cell separators 16. The electrolyte film 10 is, e.g., a perfluorosulfoninc acid-based ion-exchange resin film. Each of the anode 12 and the cathode 14 is constituted of a diffusion layer using, e.g., carbon paper and a sheet-like catalyst layer in which a noble metal catalyst is carried by a carrier such as carbon. The diffusion layer is arranged on the fuel cell separator 16 side, whereas the catalyst layer is arranged on the electrolyte film 10 side.

As shown in FIG. 1, the fuel cell 1 according to this embodiment includes a film-electrode assembly 18 in which the anode 12 is formed on one surface of the electrolyte film 10 and the cathode 14 is formed on the other surface thereof to sandwich the electrolyte film 10 therebetween and face each other; and a pair of fuel cell separators 16 which hold respective outer sides of the film-electrode assembly 18. In the fuel cell separators 16, reaction gas flow paths 20 through which a reaction gas is supplied to the anode 12 or the cathode 14 are formed.

Figure 2:
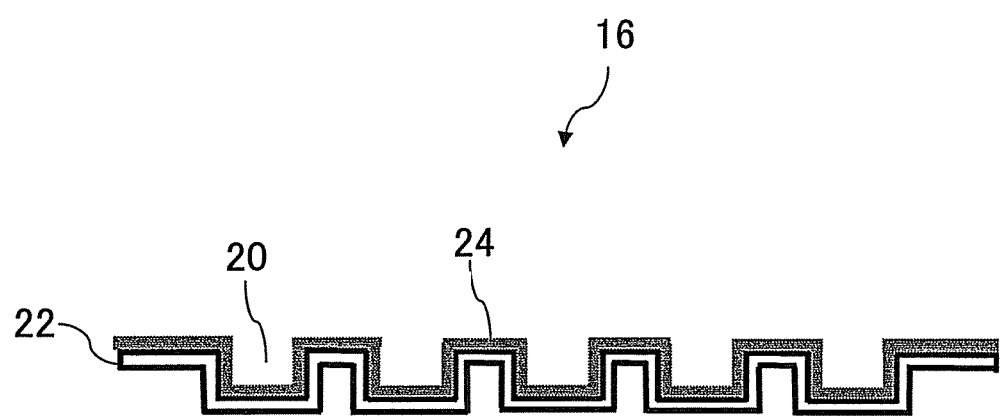
FIG. 2 is a schematic cross-sectional view showing an example configuration of a fuel cell separator according to the embodiment.

FIG. 2 is a schematic cross-sectional view showing an example configuration of a fuel cell separator according to this embodiment. As shown in FIG. 2, the fuel cell separator 16 includes a metal substrate 22 having the reaction gas flow paths 20 formed thereon and a coating layer 24 formed on the metal substrate 22. In this embodiment, a configuration where the coating layer 24 is formed on the metal substrate 22 on the reaction gas flow path 20 side (a side facing the anode 12 or the cathode 14 shown in FIG. 1) is taken as an example, but the present invention is not restricted thereto. For example, the coating layer 24 may be formed on the metal substrate 22 on the opposite side of the reaction gas flow paths 20 (a side opposite the side facing the anode 12 or the cathode 14 shown in FIG. 1), or may be formed on the metal substrate 22 on the reaction gas flow path 20 side and the opposite side of the reaction gas flow paths 20.

Figure 3A:
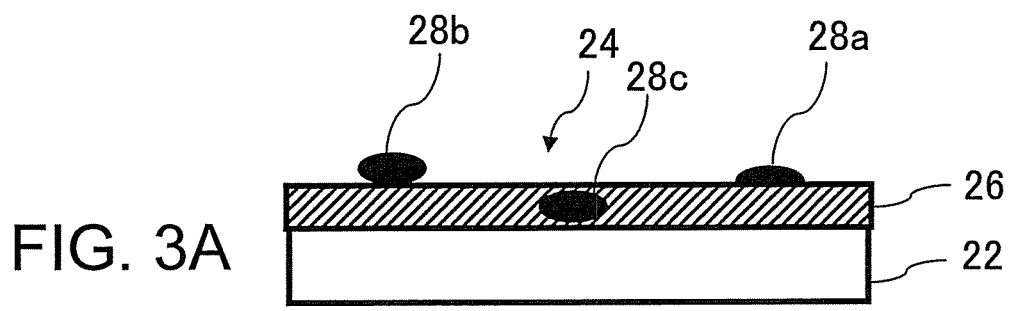
FIG. 3A is a partially enlarged schematic cross-sectional view of the fuel cell separator shown in FIG. 2.
Figure 3B:
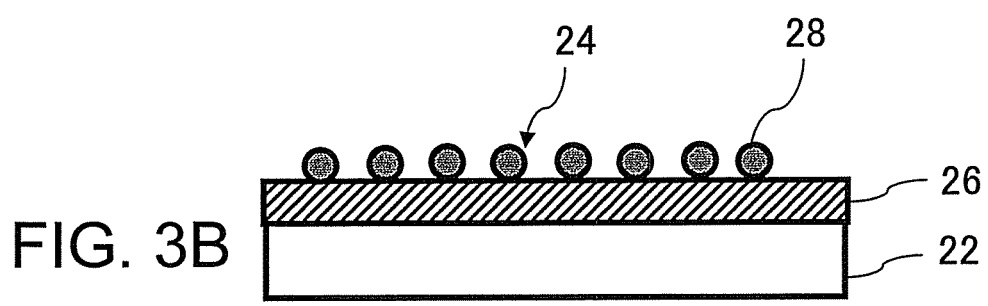
FIG. 3B is a partially enlarged schematic cross-sectional view of the fuel cell separator shown in FIG. 2.
Figure 3C:
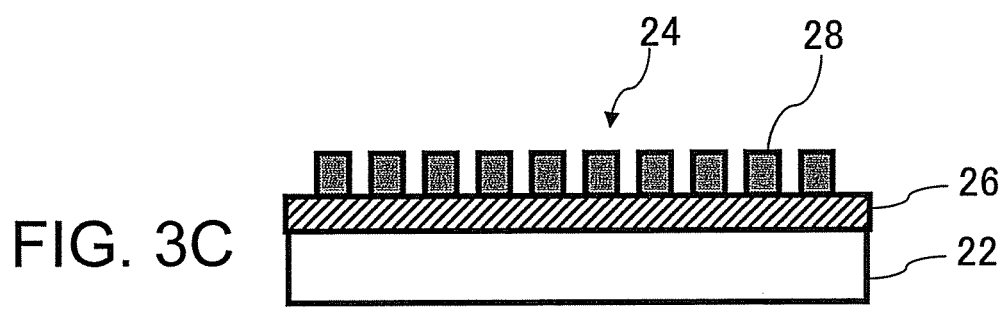
FIG. 3C is a partially enlarged schematic cross-sectional view of the fuel cell separator shown in FIG. 2.
Figure 3D:
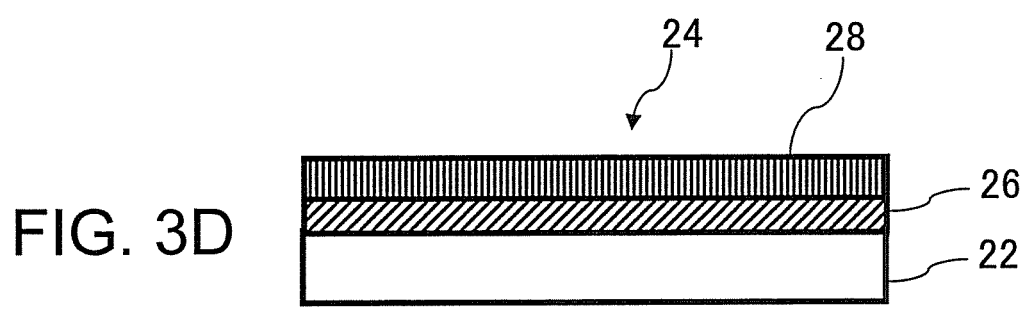
FIG. 3D is a partially enlarged schematic cross-sectional view of the fuel cell separator shown in FIG. 2.

Next, an outline of a configuration of the coating layer 24 will be described. Each of FIGS. 3(A) to (D) is a partially enlarged schematic cross-sectional view of the fuel cell separator shown in FIG. 2. As shown in FIGS. 3(A) to (D), the coating layer 24 include an amorphous carbon layer 26 and conductive sections 28 (or 28a to 28c). The amorphous carbon layer 26 serves to mainly suppress the corrosion of the metal substrate 22. Further, the conductive sections 28 serve to mainly suppress an increase in contact resistance of the fuel cell separator. Here, FIG. 3(A) is a view showing a state where the conductive sections 28 are dispersed and arranged in or on the amorphous carbon layer 26, and each of FIGS. 3(B) to (D) is a view showing a state where the conductive sections 28 are arranged on the amorphous carbon layer 26.

Preferably, the conductive sections of this embodiment are arranged in at least one of a state where the conductive sections are partially exposed from a surface of the amorphous carbon layer [e.g., the conductive sections 28a shown in FIG. 3(A)], a state where the entire conductive sections are exposed from the surface of the amorphous carbon layer [the conductive sections 28b shown in FIG. 3(A) and the conductive sections 28 shown in FIGS. 3(B) to (D)], and a state where the entire conductive sections are embedded in the amorphous carbon layer [the conductive sections 28c shown in FIG. 3(A)]. When the conductive sections are arranged in one of the above-described states, a conformation of the conductive sections may be island-like as shown in FIGS. 3(A) and (B), comb-like as shown in FIG. 3(C), or layer-like as shown in FIG. 3(D), and it is not restricted in particular. However, in the case of such an island-like conformation, the formation of the coating layer is easy, and hence the conformation of the conductive sections is preferably island-like.

The conductive sections of this embodiment are formed of a conductive material, and may be formed of, e.g., a noble metal such as Au, Pt, Ag, Ru or Ir, graphite particles (graphite sections), or carbon nanohorns or carbon nanotubes. In the light of corrosion resistance or conductive properties, the conductive sections are preferably formed of the noble metal or the graphite particles (the graphite sections), and in the light of manufacturing cost, they are more preferably formed of the graphite particles (the graphite sections).

Furthermore, the conductive sections 28a to 28c shown in FIG. 3(A) are preferably formed of the graphite particles (the graphite sections), because the use of the graphite particles facilitates the formation of the conductive sections. The conductive sections 28 shown in FIG. 3(B) are preferably formed of a noble metal such as Au, Pt, Ag, Ru, or Ir, because the use of the noble metal facilitates the formation of the conductive sections. The respective conductive sections 28 shown in FIGS. 3(C) and (D) are preferably formed of carbon nanohorns or carbon nanotubes, because the use of the carbon nanohorns or the carbon nanotubes facilitates the formation of the conductive sections.

The amorphous carbon layer 26 is constituted of amorphous carbon made of graphite (a solid) as a raw material by a known sputtering method, filtered arc ion plating method, or filterless arc ion plating method described later. Alternatively, the amorphous carbon layer 26 can be likewise formed using a hydrogen carbide-based compound (a liquid or a gas) as a raw material by a known plasma CVD method or ionized evaporation method. Furthermore, in place of the amorphous carbon layer 26, there may be utilized a layer constituted of a noble metal, the layer being formed using a noble metal such as Au, Pt, Ag, Ru, or Ir as a raw material by, e.g., a known sputtering method, plasma CVD method, ionized evaporation method, or filtered arc ion plating method.

Since the conductive sections 28 are formed in or on the coating layer 24, an increase in the contact resistance of the fuel cell separator 16 can be suppressed, even if the amorphous carbon layer 26 constituting the coating layer 24 corrodes (is damaged) in the power generation environment of the fuel cell 1. Moreover, a preferable configuration of the coating layer 24 is such a configuration of the amorphous carbon layer 26 and the conductive sections 28a to 28c as shown in FIG. 3(A) in which the conductive sections 28a to 28c are formed of the graphite particles (the graphite sections). In the above-described configuration, since both the amorphous carbon layer 26 and the conductive sections 28a to 28c are formed of the carbon material, the strength of an interface between the amorphous carbon layer and the conductive sections is high. Therefore, the conductive sections are hardly delaminated from the amorphous carbon layer, which makes it possible to suppress an increase in the contact resistance owing to delamination of the conductive sections. Next, the coating layer 24 having the amorphous carbon layer 26 and the conductive sections 28a to 28c formed of graphite particles shown in FIG. 3(A) will be described as an example.

As shown in FIG. 3(A), the fuel cell separator according to this embodiment includes the metal substrate 22 and the coating layer 24 which has the amorphous carbon layer 26 and the conductive sections 28a to 28c formed of graphite particles (hereinafter may be referred to as graphite sections 28a to 28c).

The graphite sections of this embodiment are preferably arranged in at least one of a state where the graphite sections are partially exposed from the surface of the amorphous carbon layer [e.g., the conductive sections 28a shown in FIG. 3(A)], a state where the entire graphite sections are exposed from the surface of the amorphous carbon layer [the conductive section 28b shown in FIG. 3(A)], and a state where the entire graphite sections are embedded in the amorphous carbon layer [the conductive section 28c shown in FIG. 3(A)]. To ensure high conductive properties of the coating layer, the state where the graphite sections are at least partially exposed from the surface of the amorphous carbon layer is preferable. Moreover, to prevent the graphite sections from falling off, it is preferable to take the structure where the graphite sections are held by the amorphous carbon layer; i.e., the arrangement in the state where the graphite sections are partially exposed from the amorphous carbon layer and the state where the entire graphite sections are embedded in the amorphous carbon layer. Additionally, when the conformation of the graphite sections is island-like, the coating layer can be easily formed, and hence such an island-like conformation is preferable.

The graphite sections 28a to 28c are formed of graphite particles and have higher crystallinity than the amorphous carbon layer 26. The crystallinity is evaluated by calculating an intensity ratio (D/G) of a peak intensity (G) of a peak in a range of 1540 cm$^{-1}$ to 1560 cm$^{-1}$ and a peak intensity (D) of a peak in a range of 1370 cm$^{-1}$ to 1390 cm$^{-1}$ in Raman spectrum analysis. The smaller the intensity ratio (D/G), the higher the crystallinity. The Raman spectrum can be measured by means of a known method. Specifically, a sample is irradiated with an argon laser beam having a wavelength of 514.5 nm, and spectrometry is then carried out with respect to light forming an angle of 90 degrees with irradiated light of scattered light from the sample, thereby measuring the Raman spectrum. As a measurement device, there is a laser Raman spectrometric device RAMANOR S-320 manufactured by Jobin Yvon Co. Ltd.

Graphite sections having particle diameters of less than 1 μm among the graphite sections 28a to 28c are preferably present in a ratio of 12.6 or more per μm$^2$ of the amorphous carbon layer (26). When the number of the graphite sections having particle diameters of less than 1 μm is smaller than the above-described value, the contact resistance of the fuel cell separator may rise in some cases. The number of graphite sections having the particle diameters of less than 1 μm can be obtained by photographing the surface of the amorphous carbon layer in a scanning electron micrograph, and visually counting the graphite sections having particle diameters of less than 1 μm in an area (e.g., 50 μm$^2$) of the amorphous carbon layer in the obtained micrograph.

Furthermore, graphite sections having particle diameters equal to or above 1 μm to less than 3 μm among the graphite sections 28a to 28c are preferably present in a ratio of 1.8 or more per μm$^2$ of the amorphous carbon layer (26). Moreover, more preferably, graphite sections having particle diameters of 3 μm or above among the graphite sections 28a to 28c are present in a ratio of 0.1 or more per μm$^2$ of the amorphous carbon layer (26). When the number of graphite sections having particle diameters of 1 μm or above to less than 3 μm and particle diameters of 3 μm or above is smaller than the above-described values, the contact resistance of the fuel cell separator may increase in some cases. The number of the graphite sections can be measured by the same method as described above.

The amorphous carbon layer 26 is formed of amorphous carbon (also referred to as diamond-like carbon) having an amorphous coupled state in coupling of carbon atoms. Moreover, an inclusion concentration of hydrogen included when forming the amorphous carbon layer 26 is preferably be less than 1% in terms of resistance. Additionally, a metal may be contained in the amorphous carbon layer 26 in order to increase conductive properties of the amorphous carbon layer 26; the contained metal may corrode in the power generation environment of the fuel cell. Therefore, in this embodiment, preventing a metal from being contained in the amorphous carbon layer 26 is preferable.

Figure 4:
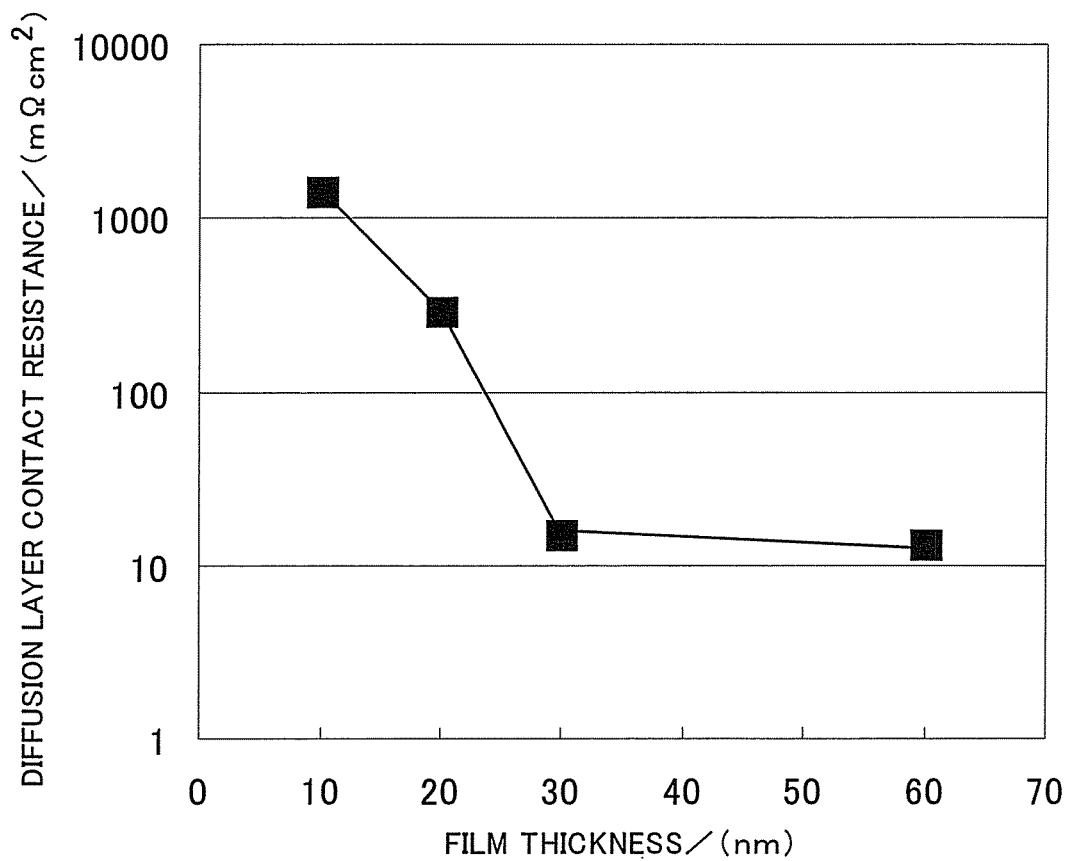
FIG. 4 is a view showing a relation between a diffusion layer contact resistance and a film thickness of an amorphous carbon layer in the fuel cell separator according to the embodiment.

The film thickness of the amorphous carbon layer 26 preferably falls within a range of 30 nm to 10 μm. FIG. 4 is a view showing a relation between a diffusion layer contact resistance of the fuel cell separator and the film thickness of the amorphous carbon layer according to this embodiment. As shown in FIG. 4, when the film thickness of the amorphous carbon layer is smaller than 30 nm, the diffusion layer contact resistance increases. That is because the island-shaped amorphous carbon layer is formed instead of the film-shaped amorphous carbon layer, when the amorphous carbon layer is formed to a thickness less than 30 nm. Further, when the film thickness is larger than 10 μm, an impractical fuel cell separator is provided.

As the corrosion current value of the coating layer, a value equal to or below 3.0 μA/cm$^2$ is preferable, and a value equal to or below 1.5 μA/cm$^2$ is more preferable. When the corrosion current value of the coating layer 24 is higher than 3.0 μA/cm$^2$, the coating layer 24 may be apt to be destroyed in the power generation environment of the fuel cell.

As the material of the metal substrate 22 used in this embodiment, a material superior in corrosion resistance is preferable, and one of stainless steel, copper, a copper alloy, aluminum, an aluminum alloy, titanium, and a titanium alloy, or a composite material including these substances can be used, for example. To avoid elution of metal ions, using titanium for the metal substrate is preferable.

Figure 5:
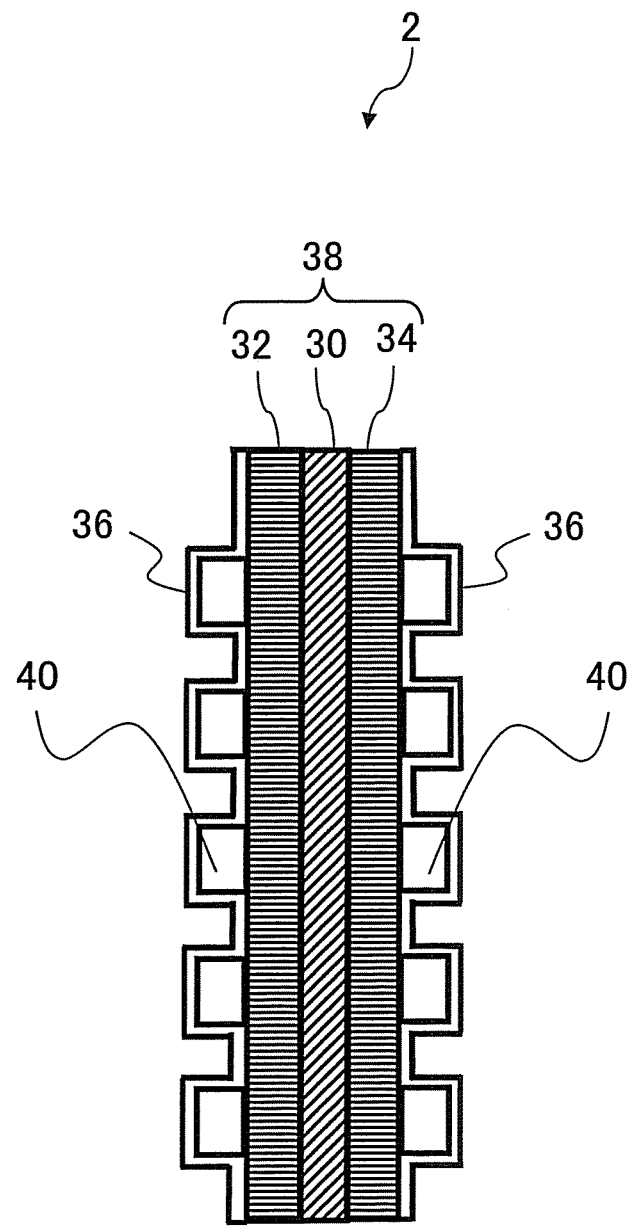
FIG. 5 is a schematic cross-sectional view showing an example configuration of a fuel cell according to another embodiment of the present invention.

FIG. 5 is a schematic cross-sectional view showing an example configuration of a fuel cell according to another embodiment of the present invention. As shown in FIG. 5, a fuel cell 2 includes an electrolyte film 30, an anode 32, a cathode 34, and fuel cell separators 36. The electrolyte film 30 is, e.g., a perfluoro sulfonate-based ion-exchange resin film. Each of the anode 32 and the cathode 34 is formed of a diffusion layer using, e.g., carbon paper and a sheet-like catalyst layer in which a noble metal catalyst is carried by a carrier such as carbon, and the diffusion layer is arranged on the fuel cell separator 36 side, whereas the catalyst layer is arranged on the electrolyte film 30 side.

As shown in FIG. 5, the fuel cell 2 according to this embodiment includes a film-electrode assembly 38 in which the anode 32 is formed on one surface of the electrolyte film 30 and the cathode 34 is formed on the other surface to sandwich the electrolyte film 30 therebetween and face each other and the pair of fuel cell separators 36 that hold both outer sides of the film-electrode assembly 38. Reaction gas flow paths 40 through which a gas is supplied to the anode 32 or the cathode 34 are formed on the fuel cell separator 36.

Figure 6:
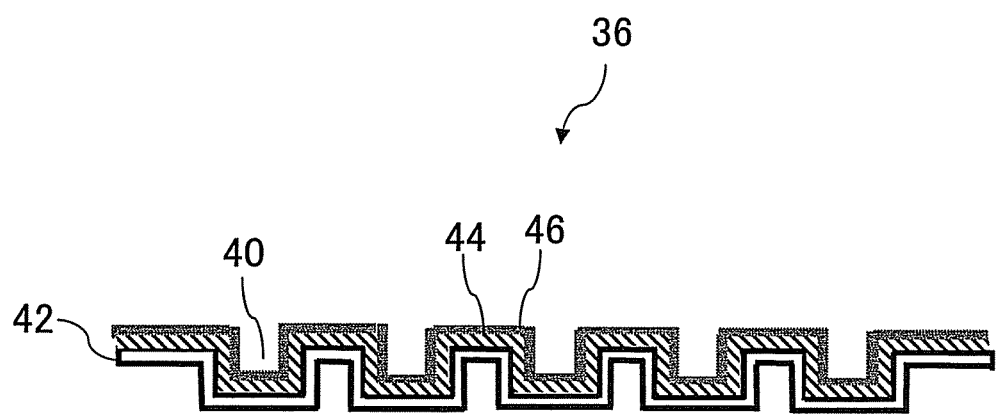
FIG. 6 is a schematic cross-sectional view showing an example configuration of a fuel cell separator according to another embodiment of the present invention.

FIG. 6 is a schematic cross-sectional view showing an example configuration of the fuel cell separator according to another embodiment of the present invention. As shown in FIG. 6, the fuel cell separator 36 includes a metal substrate 42 that has the reaction gas flow paths 40 formed thereon and an intermediate layer 44 and a coating layer 46 that are formed on the metal substrate 42. In this embodiment, the configuration where the intermediate layer 44 and the coating layer 46 are formed on the metal substrate 42 on the reaction gas flow path 40 side (a side facing the anode 32 or the cathode 34 shown in FIG. 5) is taken as an example, but the present invention is not restricted thereto. For example, the intermediate layer 44 and the coating layer 46 may be formed on the metal substrate 42 on an opposite side (an opposite side of the side facing the anode 32 or the cathode 34 shown in FIG. 5) of the reaction gas flow paths 40 or may be formed on the metal substrate 42 on the reaction gas flow path 40 side or on the opposite side of the reaction gas flow paths 40.

As the material of the metal substrate 42 used in this embodiment, a material superior in corrosion resistance is preferable, and one of stainless steel, copper, a copper alloy, aluminum, an aluminum alloy, titanium, and a titanium alloy, or a composite material including these substances can be used, for example. Further, in the light of the corrosion resistance of the metal substrate, using titanium as the metal substrate 42 is preferable. Furthermore, a titanium layer (the intermediate layer 44) having a higher purity than a titanium purity of the metal substrate 42 is preferably arranged between the metal substrate 42 and the coating layer 46. Adopting such a configuration enables suppressing delamination of the coating layer 46. Moreover, an amount of the metal having a high purity to be used can be suppressed, which is also preferable from the viewpoint of manufacturing cost. The titanium layer is formed by, e.g., a sputtering method.

Additionally, the film thickness of the titanium layer (the intermediate layer 44) preferably falls within a range of 25 nm to 10 μm. Since uniformly forming the titanium layer thinner than 25 nm without defects is technically difficult, an oxide layer having a titanium oxide remaining in the metal substrate 42 as a nucleus is generated, whereby the contact resistance of the fuel cell separator may increase or the coating layer 46 may be readily delaminated from the metal substrate 42. When this film thickness is larger than 10 μm, an impractical fuel cell separator is provided.

Although the titanium layer is used as the intermediate layer 44 in this embodiment, the present invention is not restricted thereto if the metal substrate is changed, and the intermediate layer 44 which is formed of an element constituting the metal substrate and has excellent adhesion with respect to C (carbon) can be used.

A manufacturing method of a fuel cell separator according to this embodiment will now be described.

The manufacturing method of the fuel cell separator according to this embodiment includes: an amorphous carbon layer forming step of forming the amorphous carbon layer on the metal substrate by means of the physical vapor deposition method or the chemical vapor deposition method; and conductive sections forming step of forming the conductive sections on the amorphous carbon layer by means of a method equivalent to or different from the physical vapor deposition method or the chemical vapor deposition method.

<Amorphous Carbon Layer Forming Step>

At the amorphous carbon layer forming step, the physical vapor deposition method or the chemical vapor deposition method is used to form the amorphous carbon layer on the metal substrate. Specifically, graphite (a solid) or the like can be used as a raw material to form the amorphous carbon layer by, e.g., a known sputtering method, filtered arc ion plating method, or filterless arc ion plating method described later. Alternatively, a hydrogen carbide-based compound (a liquid or a gas) can be used as a raw material to form the amorphous carbon layer by a known plasma CVD method or ionized evaporation method.

<Conductive Sections Forming Step>

At the conductive sections forming step, the physical vapor deposition method or the chemical vapor deposition method can be used to form the conductive sections on the metal substrate. Specifically, a noble metal such as Au, Pt, Ag, or Co or a carbon material such as graphite (a solid) can be used as a raw material to form the conductive sections by utilizing, e.g., a known inkjet method, sputtering method, arc ion plating method, plasma CVD method, ionized evaporation method, or filterless arc ion plating method described later.

When forming the conductive sections 28a to 28c shown in FIG. 3(A), a carbon material such as graphite (a solid) can be used as a raw material to form graphite sections by, e.g., the later-explained filterless arc ion plating method. When forming the conductive sections 28 shown in FIG. 3(B), a noble metal such as Au, Pt, or Ag can be used as a raw material to form the conductive sections consisting of the noble metal by, e.g., the known inkjet method, gas-phase synthesis method, or plating method. When forming the conductive sections 28 shown in FIG. 3(D), a hydrocarbon gas such as a methane gas or an ethane gas can be used as a raw material to form the conductive sections by a known plasma CVD method. When forming the conductive sections 28 shown in FIG. 3(C), a hydrocarbon gas such as a methane gas or an ethane gas can be used as a raw material to form the conductive sections by a known plasma CVD method or the like, and then the conductive sections are formed into a comb-like conformation by reactive ion etching.

As the physical vapor deposition method of forming the amorphous carbon layer and the conductive sections, use of the filterless arc ion plating method among the above-described methods is preferable. Adopting this method enables forming the amorphous carbon layer and forming the graphite sections as the conductive sections, thereby simplifying the manufacturing method. Furthermore, when this method is utilized, the amorphous carbon layer 26 and the graphite sections 28a to 28c such as shown in FIG. 3(A) can be formed.

Figure 7:
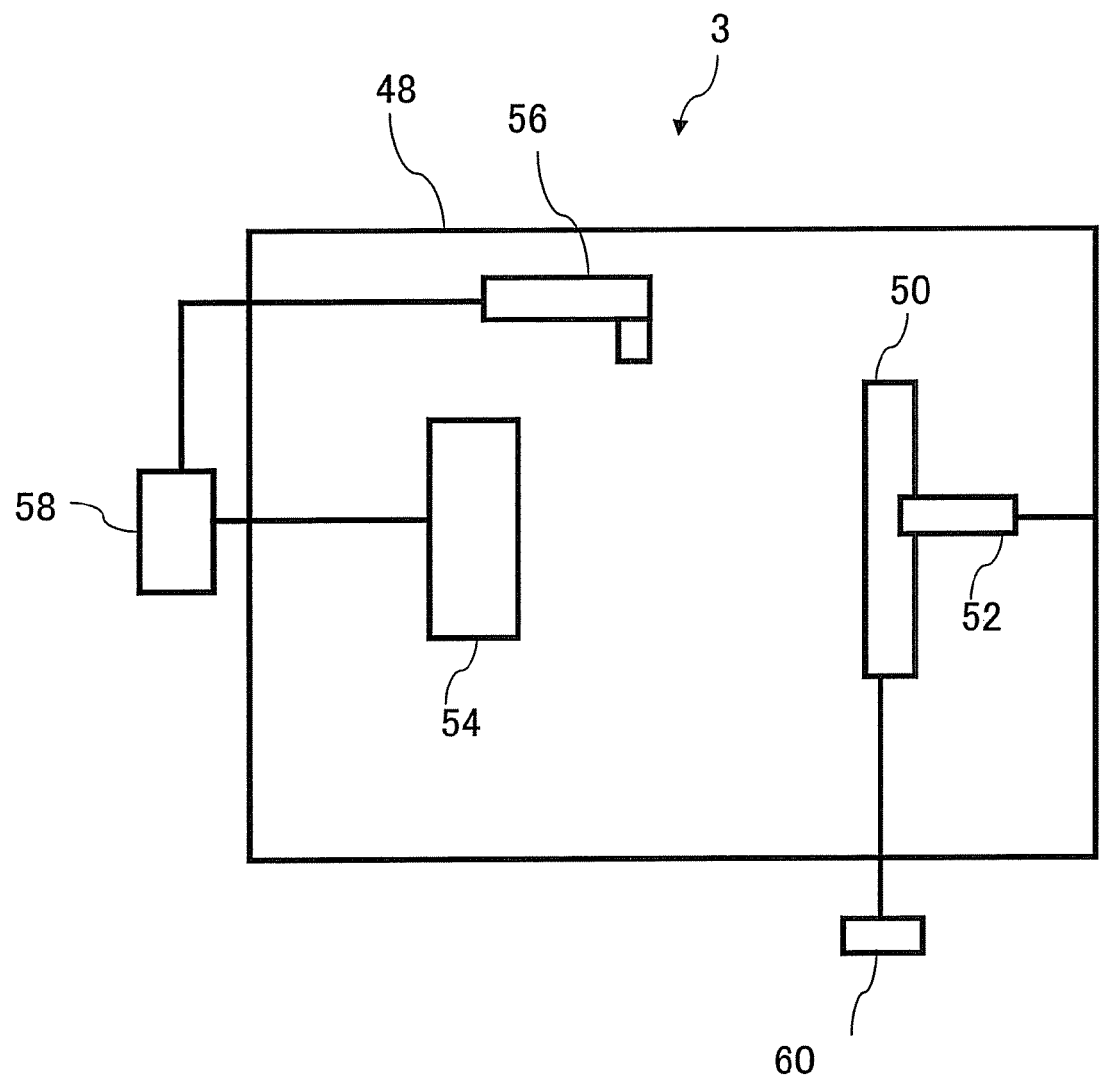
FIG. 7 is a schematic view showing an example configuration of a filterless arc ion plating apparatus that can form an amorphous carbon layer and a graphite layer by a filterless arc ion plating method.

FIG. 7 is a schematic view showing an example configuration of a filterless arc ion plating apparatus which can form the amorphous carbon layer and the graphite sections by a filterless arc ion plating method. As shown in FIG. 7, the filterless arc ion plating apparatus 3 has a vacuum container 48 evacuated by a vacuum exhaust pump (not shown), a mounting jig 52 which holds a metal substrate 50 as an object to be processed, a target 54 which forms a cathode, an anode 56, an arc power supply 58 connected between the target 54 and the anode 56, and a bias power supply 60 which applies a bias voltage to the metal substrate 50.

To form the amorphous carbon layer and the graphite sections on the metal substrate 50, the arc power supply 58 is first activated to effect arc discharge between the anode 56 and the target 54. As a result of this arc discharge, the target 54 locally dissolves and evaporates to be ionized at the same time. An ionized material (a material which is obtained when the target evaporates to be ionized, and will hereinafter be referred to as an ionized vaporized material) is accelerated by applying a bias voltage to the metal substrate 50 from the bias power supply 60, and the metal substrate 50 is coated with this accelerated material, thereby forming the amorphous carbon layer.

For the above-described formation of the amorphous carbon layer, the filterless arc ion plating method and a known filtered arc ion plating method can similarly be used. In the filterless arc ion plating method and the filtered arc ion plating method, when the target evaporates to be ionized, molten particles (droplets) are generated. When the molten particles adhere to the metal substrate 50, the uniform amorphous carbon layer cannot be formed. Therefore, in the known filtered arc ion plating method, a filter which prevents the molten particles from passing therethrough (a masking shield) is provided between the metal substrate 50 and the target 54. According to the filterless arc ion plating method used in this embodiment, the metal substrate 50 is coated with the ionized vaporized material and the molten particles without using the filter. The target 54 used in this embodiment is a carbon material. Furthermore, the molten particles generated from the target 54 are graphite having high crystallinity. Accordingly, when the filterless arc ion plating method is used, the ionized vaporized material enables formation of the amorphous carbon layer, and the graphite sections are formed by adhesion of the molten particles to the metal substrate 50.

The bias voltage applied to the metal substrate 50 preferably falls within a range of 150 V to 1000 V in terms of manufacture of the fuel cell separator having low contact resistance. A contact resistance that can be used for the fuel cell separator (e.g., 10 mΩ·cm$^2$) may fail to be obtained when the bias voltage applied to the metal substrate 50 is lower than 150 V, and a load may be applied to the metal substrate 50 to cause damage when the bias voltage is higher than 1000 V. Moreover, the bias voltage applied to the metal substrate 50 preferably falls within a range of 150 V to 250 V or a range of 700 V to 1000 V in terms of manufacture of the fuel cell separator having low contact resistance and a low corrosion current value, and more preferably the same falls within a range of 150 V to 250 V in terms of, e.g., power consumption at the time of manufacturing the fuel cell separator.

EXAMPLES

Although the present invention will now be described in more detail in accordance with examples, the present invention is not restricted by the following examples unless the scope of the invention is changed.

<Fabrication of Fuel Cell Separator>

Examples 1 to 8

Such a filterless arc ion plating apparatus 3 as shown in FIG. 7 was used to form a coating layer such as shown in FIG. 3(A). Specifically, a carbon material was used as a target 54 to effect arc discharge between the target 54 and an anode 56, a bias voltage 50 V was applied to a titanium plate as a metal substrate 50, and an amorphous carbon layer and the coating layer having graphite sections as conductive sections were formed on the titanium plate. This was determined as Example 1. Further, in Examples 2 to 8, application of a bias voltage of 150 V, application of a bias voltage of 200 V, application of a bias voltage of 250 V, application of a bias voltage of 500 V, application of a bias voltage of 750 V, application of a bias voltage of 1000 V, and no application of a bias voltage were performed in place of application of the bias voltage in Example 1.

Comparative Examples 1 to 3

A carbon material was used as a target in a sputtering method to form an amorphous carbon layer on a titanium plate, which was a configuration of Comparative Example 1. Moreover, in a filtered arc ion plating method, a carbon material was used as a target, and arc discharge was then effected between the target and an anode to form an amorphous carbon layer, which was a configuration of Comparative Example 2. Additionally, a titanium plate which was plated with Au was a configuration of Comparative Example 3.

<Measurement of Contact Resistance>

Two separators cut into predetermined dimensions (2 cm×2 cm) were prepared in accordance with each example, respective surfaces each having the coating layer formed thereon in each example were overlapped, both outer sides of this laminated structure were held by a copper plate, a load of 1 MPa was applied, and a contact resistance (a similar material contact resistance) of the separators in each embodiment was measured by a generally utilized alternating-current four-terminal method (a current 1 A). Further, each example cut to predetermined dimensions (2 cm×2 cm) and carbon paper (a diffusion layer) were prepared, a surface having the coating layer formed thereon and the diffusion layer (the carbon paper) in each example were overlapped, both outer sides of this laminated structure were held by a copper plate, a load of 1 MPa was applied, and a contact resistance (a diffusion layer contact resistance) of each example and the diffusion layer was measured by a generally utilized alternating-current four-terminal method (the current 1 A). Measurement was performed in each comparative example by means of the same method.

<Measurement of Corrosion Current Value>

A counter electrode [a Pt plate (4 cm×4 cm)], a reference electrode [a Pt plate (4 cm×4 cm)], and a work electrode [each example (4 cm×4 cm)] were immersed in 300 ml of a nitric acid water solution (pH 4) serving as an electrolyte at 80° C., and a corrosion current value of each example was measured by using a standard voltammetry tool (SV-100 manufactured by Hokuto Denko Corporation) with a holding potential of 1000 mV (vs. SHE) and a measurement time of 50 hours. Additionally, measurement was also performed with respect to each comparative example by the same method.

Figure 8:
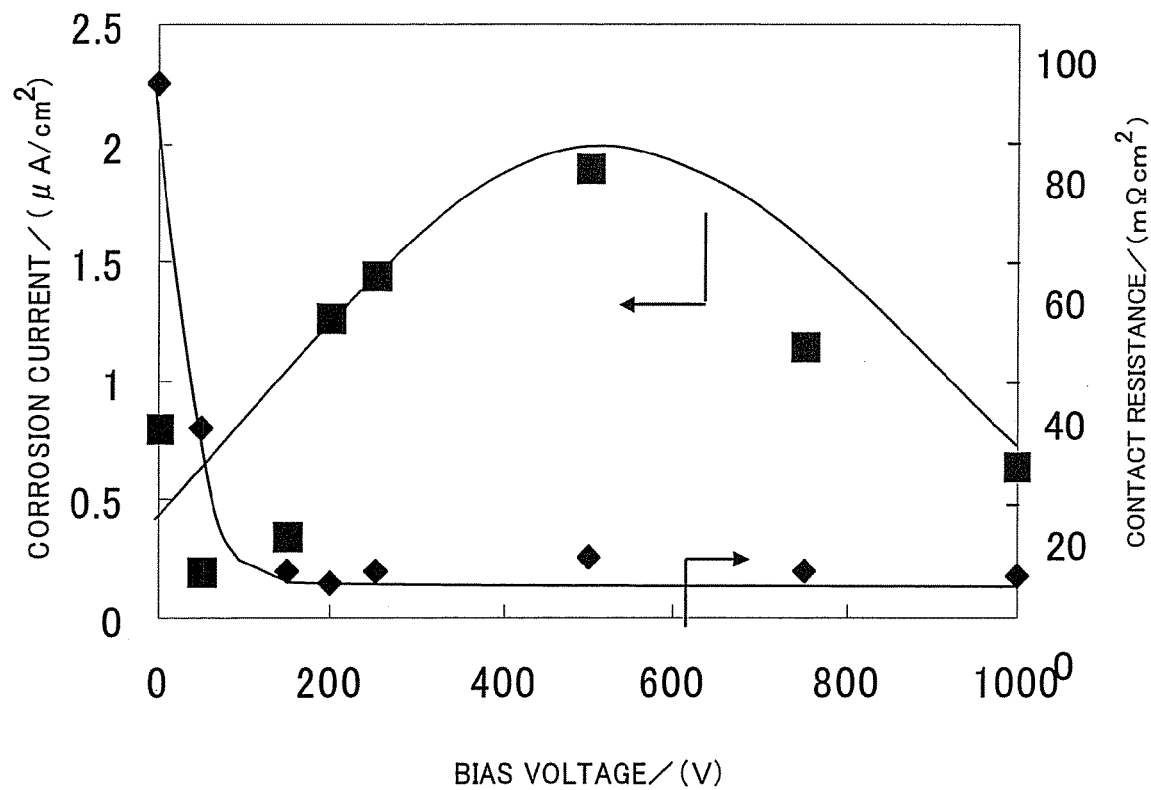
FIG. 8 is a graph showing results of a contact resistance (a similar material contact resistance+a diffusion layer contact resistance) and a corrosion current value according to each of Examples 1 to 8.

FIG. 8 is a graph showing results of the contact resistances (the similar material contact resistance+the diffusion layer contact resistance) and the corrosion current value in each of Examples 1 to 8. Here, an abscissa in FIG. 8 represents a bias voltage applied to the titanium plate when forming the coating layer in each of Examples 1 to 8, in order to facilitate explanation. As shown in FIG. 8, a value of the similar material contact resistance+the diffusion layer contact resistance in each of Examples 1 to 8 was a value lower than a practical level for the fuel cell separator (e.g., 10 mΩ·cm$^2$ or below) (in particular, a range where the bias voltage is 150 to 1000 V [Examples 2 to 7)]. Further, as shown in FIG. 8, the corrosion current value in each of Examples 1 to 8 was 2.5 μA/cm$^2$ or below, which is a value smaller than a practical level for the fuel cell separator (e.g., 3 μA/cm$^2$ or below). In particular, in a range where the bias voltage is 150 V to 200 V (Examples 2 and 3) or 750 V to 1000 V (Examples 6 and 7), the corrosion current value was 1.5 μA/cm$^2$ or below and the contact resistance was 10 mΩ·cm$^2$ or below. Furthermore, applying the bias voltage within the range of 150 V to 200 V (Examples 2 and 3) rather than applying the bias voltage within the range of 750 V to 1000 V (Examples 6 and 7) is preferable in terms of power consumption at the time of manufacturing the fuel cell separator. Therefore, in regard to the low contact resistance, the low corrosion current value, the low power consumption, and others, Examples 2 and 3 in which the bias voltage in the range of 150 V to 200 V was applied were most preferable.

<Measurement of Number of Graphite Sections>

Figure 9A:
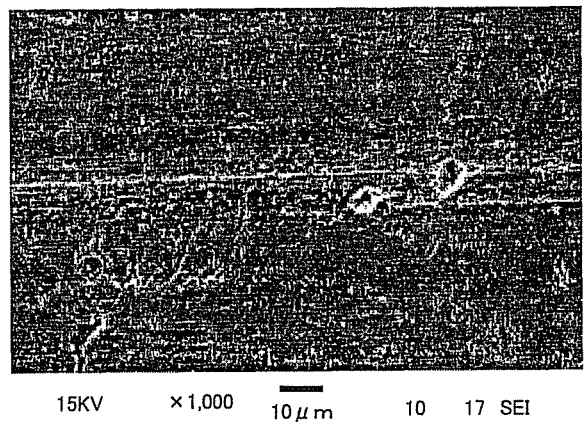
FIG. 9A is a scanning electron micrograph according to Example 2.
Figure 9B:
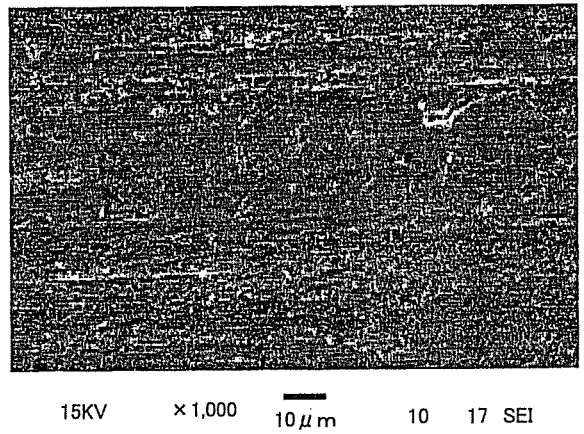
FIG. 9B is a scanning electron micrograph according to Example 8.

In each of Examples 2 and 8, scanning electron micrographs were taken. FIG. 9(A) shows a scanning electron micrograph of Example 2, and FIG. 9(B) shows a scanning electron micrograph of Example 8. Furthermore, Example 3 was also photographed in the formed of a scanning electron micrograph (not shown). The number of the graphite sections having particle diameters of less than 1 µm, the number of the graphite sections having particle diameters of 1µ or above and less than 3µ, and the number of the graphite sections having particle diameters of 3 µm or more were visually confirmed from an area of the amorphous carbon layer (50 µm×50 µm) in each obtained micrograph, and Table 1 shows results by conversion of the obtained number into the number per µm².

TABLE 1

|  | The number of graphite sections per µm² of amorphous carbon | | |
| --- | --- | --- | --- |
|  | Particle diameters of less than 1 µm | Particle diameters of 1 or above to less than 3 µm | Particle diameters of 3 µm or above |
| Example 2: bias voltage 150 V | 12.6 | 1.8 | 0.1 |
| Example 3: bias voltage 250 V | 16.0 | 2.1 | 0.3 |
| Example 8: bias voltage 0 V | 4.0 | 1.2 | 0.1 |

As can be understood from the table, the number of graphite sections increases as the bias voltage rises from 0 V (Example 10) to 150 V (Example 2) and 250 V (Example 3). Moreover, as explained above, within the range where the bias voltage is 150 to 1000 V (Examples 2 to 7), the similar material contact resistance has a lower value (10 mΩ·cm² or below) than that when no bias voltage is applied (Example 10) or when the bias voltage is 50 V (Example 1) (see FIG. 8). Therefore, in the light of reducing the contact resistance of the fuel cell separator, the number of the graphite sections having particle diameters of less than 1 µm is preferably 12.6 µm², the number of the graphite sections having particle diameters of 1µ or above to less than 3 µm is preferably 1.8/µm², and the number of the graphite sections having particle diameters of 3 µm or above preferably 0.1 µm².

Figure 10:
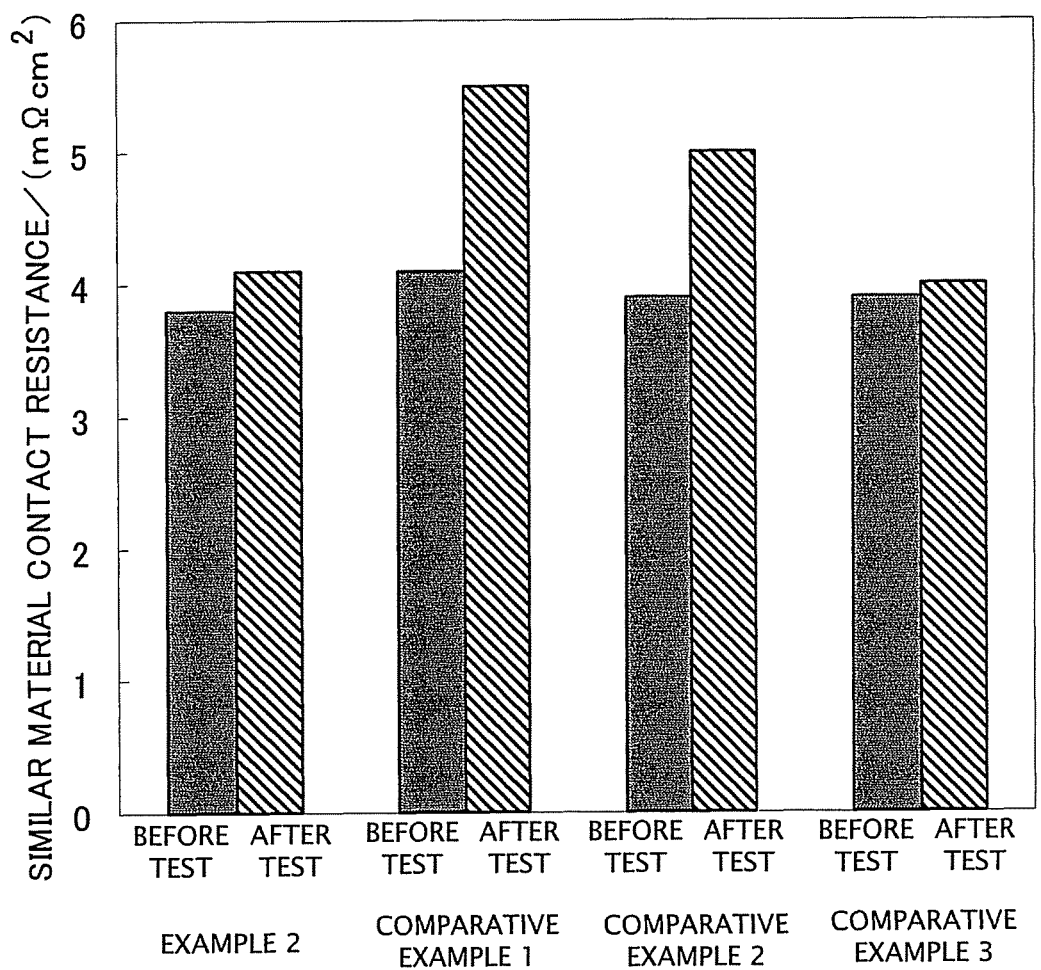
FIG. 10 is a graph showing similar material contact resistances before and after a cell environment simulation test according to Example 2 and Comparative Examples 1 to 3.

FIG. 10 is a graph showing similar material contact resistances before and after a cell environment simulation test in Example 2 and Comparative Examples 1 to 3. As shown in FIG. 10, since only the amorphous carbon layer is formed (the graphite sections are not formed) in each of Comparative Examples 1 and 2, the similar material contact resistance after the cell environment simulation test in each of Comparative Examples 1 and 2 increased 1.0 mΩ·cm² or more beyond the similar material contact resistance before the cell environment simulation test. On the other hand, since Example 2 has the graphite sections, the similar material contact resistance value after the cell environment simulation test in Example 2 increased only 0.2 mΩ·cm² beyond the similar material contact resistance before the cell environment simulation test. This is a value equivalent to that of Comparative Example 3 (a change of 0.1 mΩ·cm² before and after the test in Comparative Example 3) subjected to the plating using At which hardly corrodes.

Figure 11:
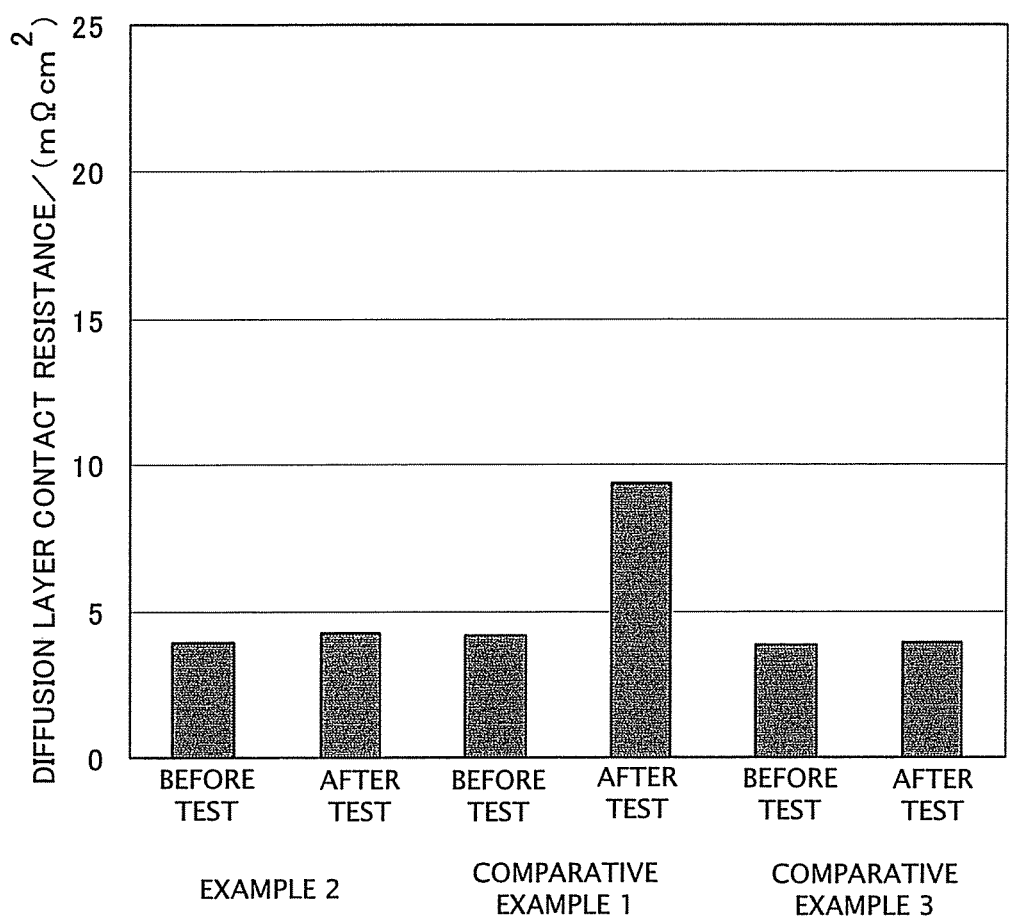
FIG. 11 is a graph showing diffusion layer contact resistances before and after the cell environment simulation test according to Example 2 and Comparative Examples 1 and 3.

FIG. 11 is a graph showing diffusion layer contact resistances before and after the cell environment simulation test in Example 2 and Comparative Examples 1 and 3. As shown in FIG. 11, the diffusion layer contact resistance value after the cell environment simulation test in Comparative Example 1 increased 5.0 mΩ·cm² beyond the diffusion layer contact resistance before the cell environment simulation test. On the other hand, the diffusion layer contact resistance after the cell environment simulation test in Example 2 increased only 0.5 mΩ·cm² beyond the diffusion layer contact resistance before the cell environment simulation test. This is a value equivalent to that in Comparative Example 3 (a change of 0.1 mΩ·cm² before and after the test in Comparative Example 3) subjected to the plating using Au which rarely corrodes.

As explained above, the above examples each having the graphite sections in the coating layer can suppress an increase in the contact resistance of the fuel cell even in the fuel cell power generation environment.

Example 9

Such a filterless arc ion plating apparatus 3 as shown in FIG. 7 was used to form a coating layer as follows. A carbon material was used as a target 54, arc discharge was effected between the target 54 and an anode 56, and a bias voltage 150 V was applied to a porous body of titanium as a metal substrate 50 to form an amorphous carbon layer and a coating layer having graphite sections on the porous body of titanium. This structure was determined as Example 9.

Comparative Examples 4 and 5

Moreover, in a filtered arc ion plating method, carbon was used as a target, and arc discharge was effected between the target and an anode to form an amorphous carbon layer on a porous body of titanium, which was a configuration of Comparative Example 4. The porous body of titanium plated with Au was a configuration of Comparative Example 5.

Figure 12:
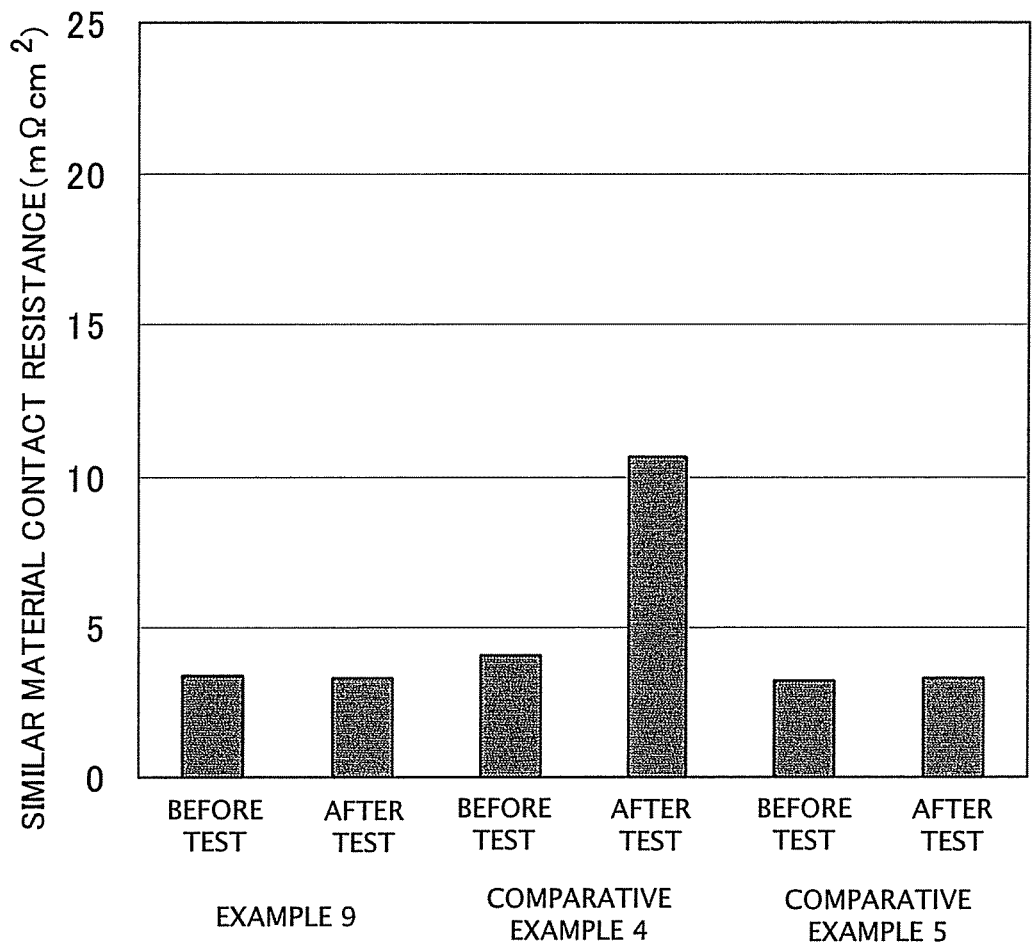
FIG. 12 is a graph showing similar material contact resistances before and after the cell environment simulation test according to Example 9 and Comparative Examples 4 and 5.

FIG. 12 is a graph showing similar material contact resistances before and after a cell environment simulation test in Example 9 and Comparative Examples 4 and 5. As shown in FIG. 12, the similar material contact resistance after the cell environment simulation test in Comparative Example 4 increased 6.0 mΩ·cm² beyond the similar material contact resistance before the cell environment simulation test. On the other hand, the similar material contact resistance value after the cell environment simulation test in Example 9 increased only 0.2 mΩ·cm² beyond the similar material contact resistance before the cell environment simulation test. This is a value equivalent to that of Comparative Example 5 (a change of 0.1 mΩ·cm² before and after the test) subjected to the plating using Au.

Figure 13:
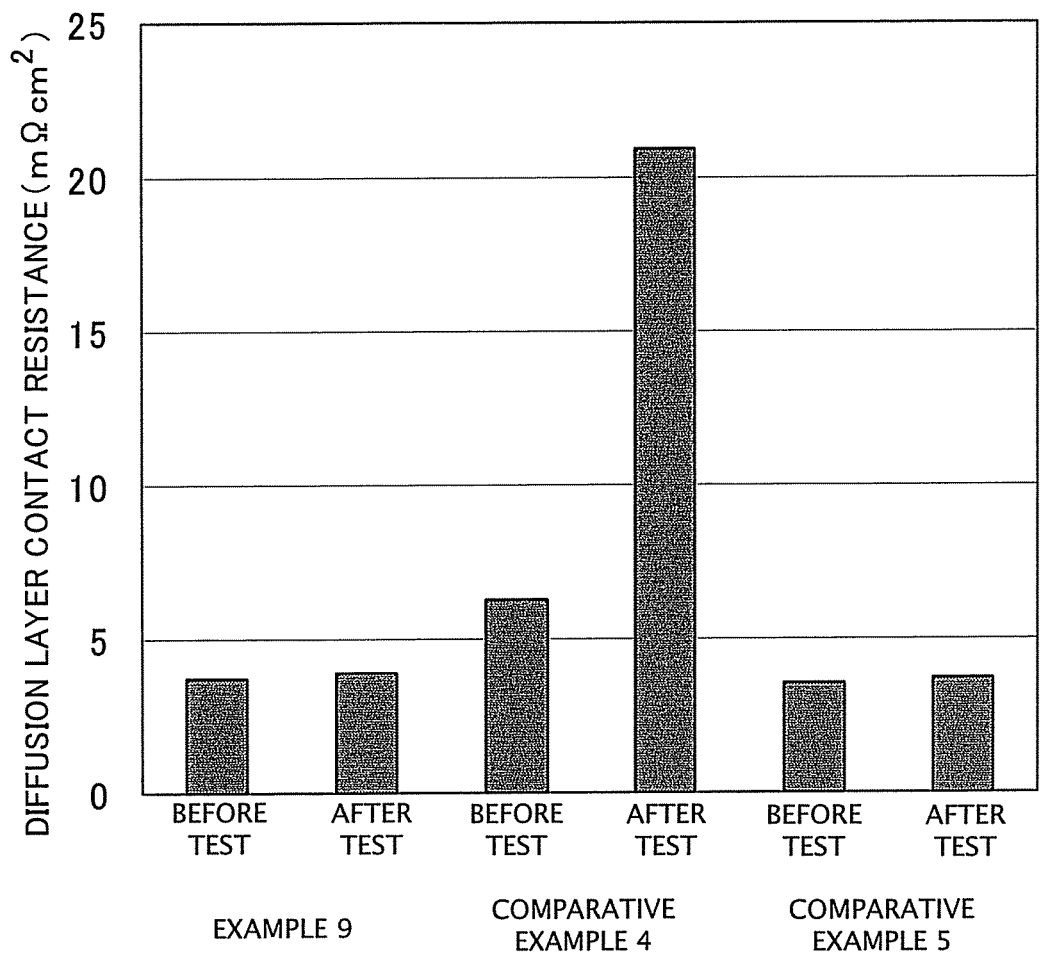
FIG. 13 is a graph showing diffusion layer contact resistances before and after the cell environment simulation test according to Example 9 and Comparative Examples 4 and 5.

FIG. 13 is a graph showing diffusion layer contact resistances before and after the cell environment simulation test in Example 9 and Comparative Examples 4 and 5. As shown in FIG. 13, the similar material contact resistance after the cell environment simulation test in Comparative Example 4 increased 14.5 mΩ·cm² beyond the similar material contact resistance before the cell environment simulation test. On the other hand, the similar material contact resistance value after the cell environment simulation test in Example 9 increased only 0.2 mΩ·cm² beyond the similar material contact resistance before the cell environment simulation test. This is a value equivalent to that of Comparative Example 5 (a change of 0.1 mΩ·cm² before and after the test).

As explained above, even in the example where the coating layer having the graphite sections is formed on not only the metal substrate but also the porous body, the increase in the contact resistance of the fuel cell separator can be suppressed in the fuel cell power generation environment.

Examples 10 to 13

In the sputtering method, titanium was used as a target, and a titanium layer (a film thickness 2.5 nm) was formed on a titanium substrate. Then, such a filterless arc ion plating apparatus 3 as shown in FIG. 7 was used to form a coating layer as follows. A carbon material was used as a target 54, arc discharge was effected between the target 54 and an anode 56, and a bias voltage 250 V was applied to a titanium plate as a metal substrate 50, thereby forming an amorphous carbon layer and the coating layer having graphite sections on the titanium layer. This structure was determined as Example 10. Additionally, Examples 11 to 13 are the same as Example 10 except that the film thickness of the titanium layer is 7.5 nm, 25 nm, or 50 nm.

<Delamination Test of Coating Layer>

1000 fuel sell separators were prepared in accordance with each of Examples 10 to 13, an adhesive tape was put on each of these separators, then the adhesive tape was removed, and a state of each coating layer was visually observed.

Although the delamination of the coating layer was observed in each of Examples 10 and 11, the delamination of the coating layer was not confirmed in each of Examples 12 and 13. Therefore, each of Examples 12 and 13 in which the film thickness of the titanium layer is 25 nm or above is preferable, since the coating layer can be formed to have high adhesion.

As explained above, when the coating layer formed on the metal substrate is formed of the amorphous carbon layer and the graphite sections, there can be provided a fuel cell separator that can suppress the corrosion of the metal substrate and inhibit the increase in the contact resistance of the fuel cell separator even in the fuel cell power generation environment.

Moreover, when titanium is used as a material constituting the metal substrate and the titanium layer is arranged between the metal substrate and the coating layer, the fuel cell separator having the improved adhesion of the coating layer can be obtained. In particular, setting the film thickness of the titanium layer to 25 nm or above is effective.

Additionally, using the filterless arc ion plating method enables formation of the amorphous carbon layer and the graphite sections in a simple manufacturing process.

INDUSTRIAL APPLICABILITY

The fuel cell according to the present invention is effective in any application so long as it is an application utilizing the fuel cell, and can be used for, e.g., a small power supply for a mobile device such as a mobile phone or a portable personal computer, a car power supply, or a stationary power supply.

The invention claimed is:

1. A fuel cell separator which has a coating layer on a metal substrate, wherein:
   the coating layer has an amorphous carbon layer and conductive sections; and
   the conductive sections are graphite sections formed of graphite particles and the graphite sections are arranged in a state where at least some of the graphite sections are partially embedded in the amorphous carbon layer and are partially exposed from a surface of the amorphous carbon layer,
   wherein the graphite particles which form the graphite sections have higher crystallinity than the amorphous carbon layer.

2. The fuel cell separator according to claim 1, wherein the graphite sections are dispersed and arranged in the manner of islands.

3. The fuel cell separator according to claim 2, wherein graphite sections having particle diameters of less than 1 μm among the graphite sections are present in a ratio of 12.6 or more per μm$^2$ of the amorphous carbon layer.

4. The fuel cell separator according to claim 2, wherein graphite sections having particle diameters of 1 μm or above to less than 3 μm among the graphite sections are present in a ratio of 1.8 or more per μm$^2$ of the amorphous carbon layer.

5. The fuel cell separator according to claim 2, wherein graphite sections having particle diameters of 3 μm or above among the graphite sections are present in a ratio of 0.1 or more per μm$^2$ of the amorphous carbon layer.

6. The fuel cell separator according to claim 1, wherein the film thickness of the amorphous carbon layer is within a range of 30 nm to 10 μm.

7. The fuel cell separator according to claim 1, wherein the corrosion current value of the coating layer is 1.5 μA/cm$^2$ or below.

8. The fuel cell separator according to claim 1, wherein the metal substrate is made of titanium and a titanium layer, which has a higher titanium purity than the titanium of the metal substrate, is arranged between the metal substrate and the coating layer.

9. The fuel cell separator according to claim 8, wherein the film thickness of the titanium layer falls within a range of 25 nm to 10 μm.

10. A fuel cell including a fuel cell separator which has a coating layer on a metal substrate, wherein:
    the coating layer has an amorphous carbon layer and conductive sections; and
    the conductive sections are graphite sections formed of graphite particles; and
    the graphite sections are arranged in a state where the graphite sections are arranged in a state where the graphite sections are partially embedded in the amorphous carbon layer and are partially exposed from a surface of the amorphous carbon layer are partially exposed from a surface of the amorphous carbon layer,
    wherein the graphite particles which form the graphite sections have higher crystallinity than the amorphous carbon layer.

* * * * *